United States Patent
O'Hagan (12)

(10) Patent No.: US 6,321,518 B1
(45) Date of Patent: Nov. 27, 2001

(54) LAND CLEARING MACHINE ATTACHMENT

(76) Inventor: John P. O'Hagan, 11443 Old Highway 105, Conroe, TX (US) 77303-5463

( * ) Notice: Subject to any disclaimer, the term of this patent is extended or adjusted under 35 U.S.C. 154(b) by 0 days.

(21) Appl. No.: 09/473,744

(22) Filed: Dec. 28, 1999

(51) Int. Cl.$^7$ .................................................. A01D 34/00
(52) U.S. Cl. ..................... 56/294; 56/504; 56/DIG. 12; 144/34.1
(58) Field of Search ............................. 56/500, 504, 249, 56/252, 294, 156, DIG. 17, DIG. 20; 37/301, 302; 144/4.1, 34.1, 334, 335, 336; 241/193, 194

(56) References Cited

U.S. PATENT DOCUMENTS

| | | | | |
|---|---|---|---|---|
| 3,693,335 | * | 9/1972 | Matthews | 56/294 |
| 3,844,096 | * | 10/1974 | Dunn | 56/504 |
| 4,259,834 | * | 4/1981 | Lambert et al. | 56/504 |
| 5,733,385 | * | 3/1998 | Dallman | 56/249 |
| 6,000,205 | * | 12/1999 | Joray | 56/294 |

FOREIGN PATENT DOCUMENTS

| | | | |
|---|---|---|---|
| 3741267 | * | 6/1988 | (DE) . |
| 2200271 | * | 8/1988 | (GB) . |

OTHER PUBLICATIONS

Field Equipment for Precommercial Thinning & Slash Treatment U.S. Dept of Agriculture, Jan. 1991 p. 3, 25.

* cited by examiner

Primary Examiner—Thomas B. Will
Assistant Examiner—Nathan Mammen
(74) Attorney, Agent, or Firm—John F. Bryan

(57) ABSTRACT

A machine attachment of the type having a plurality of swinging blades and a rotor that rotates about a horizontal axis has a cylindrical tubular rotor with stub shafts and bearings at each end for rotation about the horizontal axis, so that the body of the rotor is a single piece, large diameter tubular section having improved structural stiffness and improved flywheel effect. The blade pivot shaft attachments are mounted directly on the external surface of the tubular rotor and inset mounting pockets allow the blades to swing through the rotor interior.

15 Claims, 4 Drawing Sheets

LAND CLEARING MACHINE ATTACHMENT

TECHNICAL FIELD

The present invention relates to the field of rotary mowers and hammer mills, but more particularly, machines of this type such as are adapted to clearing and shredding trees.

BACKGROUND

In order to enhance yield, managed forestry encourages trees of a usable size to develop more rapidly by thinning out dense growths. It is desirable to shred the brush and trees removed in this process in situ, rather than haul it out for disposal. In this way, the residue creates mulch that protects and eventually enriches the soil. For the same reasons, it is also desirable to shred logging slash. In addition, logging roads and fire lanes must be cleared and maintained. In short, there are many applications in forestry for a machine with the capability to fell and/or shred trees. Highway right-of-ways, railroad right-of-ways and pipeline and power transmission line easements must be also cleared initially and periodically thereafter.

Such broad demand has generated a variety of land clearing machines, most frequently in the form of attachments to dedicated track mounted or rubber tired carriers. These machines are made in two basic configurations, either vertical or horizontal shaft. The former has its main shaft in a vertical position, like an over-sized rotary lawn-mower, the latter has its main shaft in a horizontal position, parallel to the ground like a reel-type lawn mower. In either case, the cutting and shredding is done by blades rotating at high speed. These blades may be fixed or swinging in relation to the main shaft. The fixed blade machines tend to break material up into larger chunks than the swinging blades, but the chunks are still small enough to divide the fuel for a potential fire hazard for safety purposes. This satisfies the minimum Forest Service requirements for reducing the rate of spread of a fire and making it easier to bring under control. However, most of the available equipment uses swinging blades, which generally rotate at higher speeds than would be the rule with fixed blades, and produce finer chips. The swinging blade machines require more horsepower but have a higher production rate and can be significantly lighter than an equivalent fixed blade unit. Swinging blades are also much more tolerant of impact against rocks, in that less damage is done to the blade and less shock loading is reflected back into the drive line. These factors weigh heavily in favor of swinging blade machines for all mobile, prime mover mounted applications.

As a general rule, the horizontal shaft machines are preferred in most applications. Since the horizontal shaft machines throw chips and debris only in a forward direction, they are considered to be safer than the vertical shaft machines, which tend to throw debris in all directions. These machines are also capable of cutting closer to the ground, can be more closely coupled to the carrier, and provide better operator visibility. However, lighter weight and closer coupling are relative properties, and the overhung load imposed by one of these units mounted at the front end of a carrier is such that either an oversized carrier or counterweighting may be required. Overall attachment weight is thus a significant consideration in the design of these machine attachments, along with capital cost, operating cost, performance, efficiency and durability.

These machines are expected to fell unwanted trees, cut fairly close to the ground, and shred whatever stands in the way. Such work is a continuum of abusive shock loads, a condition which must be carefully addressed in every structural and dynamic aspect of machine design. If weight and cost are of no concern, durability can be achieved by oversizing all of the components. Durability can also be achieved by placing load limiting slipclutches or shear pins at every critical point in the machine, but only if performance is of no concern. In short, every design decision is a compromise between conflicting requirements. That being said, the ideal machine will be inexpensive to manufacture, have no excessive structure or power, and perform adequately on the available power, with excellent efficiency. The challenge is to approach the ideal as closely as possible. To minimize excess structure it is obviously necessary to avoid over-sizing the component parts or using inappropriate materials. More than that however, the configuration of the machine, and each of its component parts, must be critically evaluated for structural and functional efficiency. If a part can be made to serve dual purposes, it may be possible to eliminate, or drastically reduce, the weight of a second part.

As an example, in some prior art, horizontal shaft machines it is recognized that the protective cover that guards the rotor and confines debris dispersal also serves as a structural frame component. By incorporating bent flanges and closed sections into the shroud shape, its stiffness and structural contribution is greatly enhanced while, at the same time, manufacturing costs are reduced. The present invention extends the scope of such opportunities.

A first object of the present invention is therefore, to provide a machine attachment capable of felling and shredding trees up to twelve inches in diameter in one pass. A second object is to provide this machine in a lightweight, readily manufactured configuration that will be relatively inexpensive to acquire and maintain. A third object is to provide such a machine in a durable form, that can run at least 2,500 hours between scheduled overhauls.

SUMMARY OF THE INVENTION

The present inventions contemplate improved apparatus for land clearing machine attachments. These inventions relate to or employ some steps and apparatus well known in the machine attachment arts and therefore, not the subject of detailed discussion herein.

The present inventions comprise apparatus for a machine attachment of the type having a plurality of swinging blades and a rotor that rotates about a horizontal axis. The rotor is a cylindrical tube with a stub shaft at each end to mount bearings for the tube to rotate about its horizontal axis. Blade pivot shafts are mounted on the external surface of the tubular rotor, so that the blade pivot axes are substantially parallel to the horizontal axis. The blade pivot shafts locate and hold the blades for swinging movement about the pivot shaft axes and pockets are provided so that the blades pass within the rotor interior as they swing. In this manner, the body of the rotor is made as a monolithic, large diameter tubular section that imparts a high degree of strength and stiffness and an improved flywheel effect. This tubular section resists distortion during fabrication, so that the rotor is readily balanced. Moreover, because of the improved stiffness of the large diameter tubular section, it resists deflection in abusive service and stays balanced.

BRIEF DESCRIPTION OF THE DRAWINGS

The accompanying drawings are incorporated into and form a part of the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
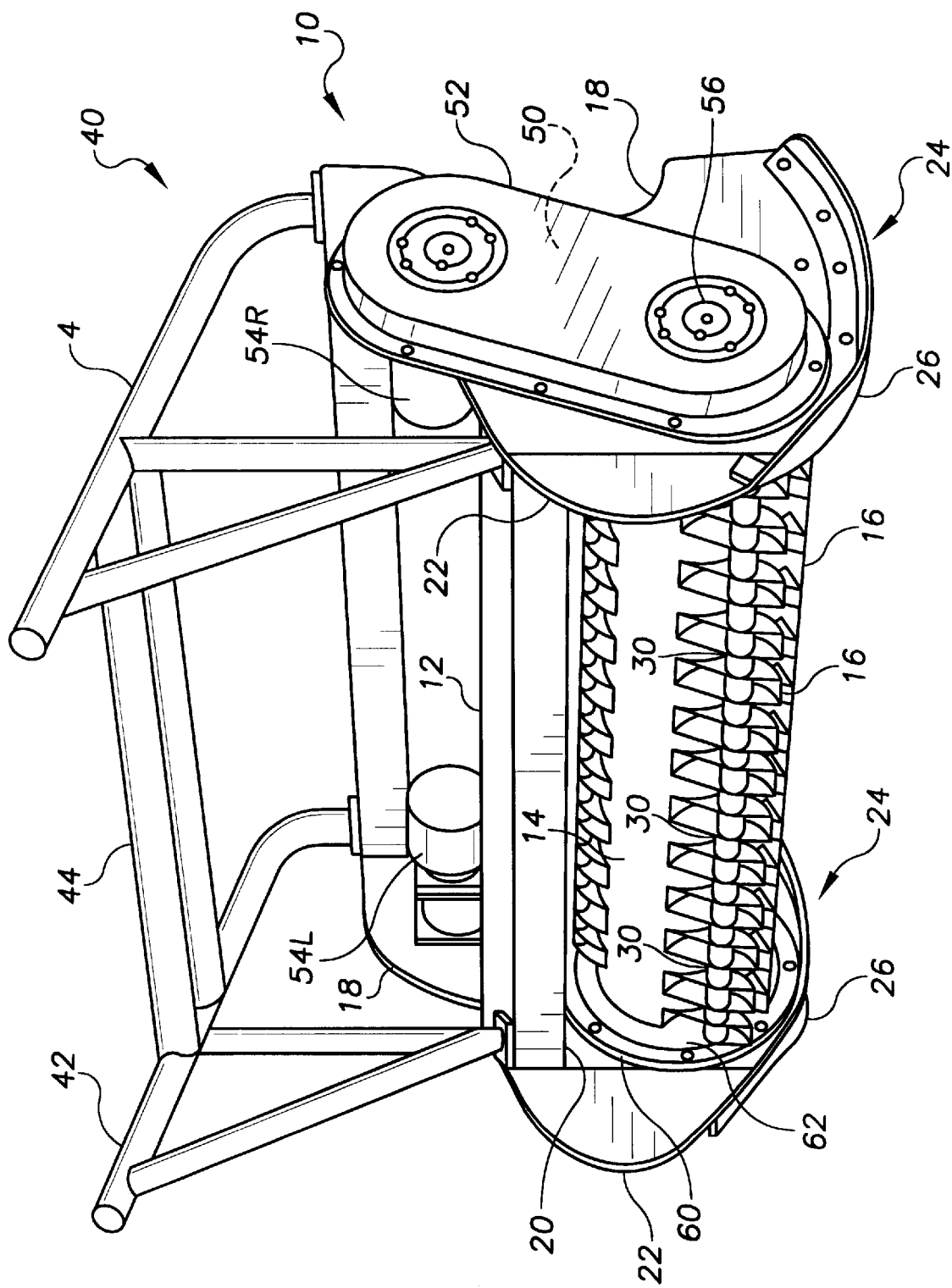
FIG. 1 is a perspective view of a preferred embodiment of the land-clearing machine of the present inventions.

The present inventions are described in the following by referring to drawings of examples of how the inventions can be made and used. In these drawings, reference characters are used throughout the views to indicate like or corresponding parts. The embodiments shown and described herein are exemplary. Many details are well known in the art, and as such are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad general meaning of the terms used in the attached claims.

FIG. 1 is a three-quarter frontal view of a preferred embodiment of machine attachment 10 of the present invention. Housing 12 provides the primary structural frame for supporting the component parts and is provided with attachment means for mounting on a prime mover as is discussed below. Rotor 14, with swinging blades 16 pivotally attached, is mounted between end plates 18. End plates 18 are connected by formed shroud 20, which wraps closely around the outer arc of swinging blades 16, confining cuttings for further shredding. Shroud 20 contributes greatly to safety in that chips and debris are allowed to eject only forward or downward. The forward, or leading edges 22 of end plates 18 are bent outwardly so as to provide a gathering effect as the machine advances into brush.

The lower edges of end plates 18 are equipped with replaceable skids 24 to facilitate control of the cutting height. The preferred cutting height in most cases is as close to ground level as is practical, but if the cutting height is too low, frequent ground contact causes excessive wear of the swinging blades. Bottom plates 26 of skids 24 are curved, and contact the ground along an extended radius, so that tilting housing 12 backward or forward raises the cutting height. This sort of controlled movement is beneficial in keeping the rotor free when cutting through large tree trunks, or for load relief if machine attachment 10 is crowded so hard that rotor 14 loses speed.

Rotor 14 is a relatively large diameter tubular member with substantial wall thickness for purposes of strength and flywheel effect. Swinging blades 16 are pivotally attached to rotor 14 in a plurality of lengthwise rows by removable pivot shafts 28. Tubular blade spacers 30 are mounted directly on the outside diameter 32 of rotor 14, so that swinging blades 16 in each row are uniformly spaced apart and staggered from row-to-row. In this manner, full coverage is provided across the cutting width of rotor 14, with a minor amount of blade overlap. Swinging blades 16 are pivotally attached at their inner ends and are free to swing through 360° about pivot shafts 28 so that the tip path of blades 16 passes within rotor outside diameter 32. This freedom to swing through 360° is provided by opening clearance holes 33 for setting radiused pockets 34 into the outside diameter 32 of rotor 14, between tubular blade spacers 30. Pockets 34 close off the interior of rotor 14 from chips and debris, replace some of the structure lost in making clearance holes 33, and also contribute to the total flywheel effect.

Mounted at the upper edges of end plates 18 is rack 40, a tubular framework, with side bars 42 extending forward at either side of machine attachment 10, to gather and hold brush and trees in the cutting path of swinging blades 16. Push bar 44, positioned across the width of machine 10 in vertical alignment with the forward reach of the cutting path of swinging blades 16, bends trees forward to relieve binding of rotor 14 as the cut advances.

Toothed belt drive assembly 50, protected by guard 52, provides power from hydraulic motors 54 to each end of rotor 14.

Figure 2:
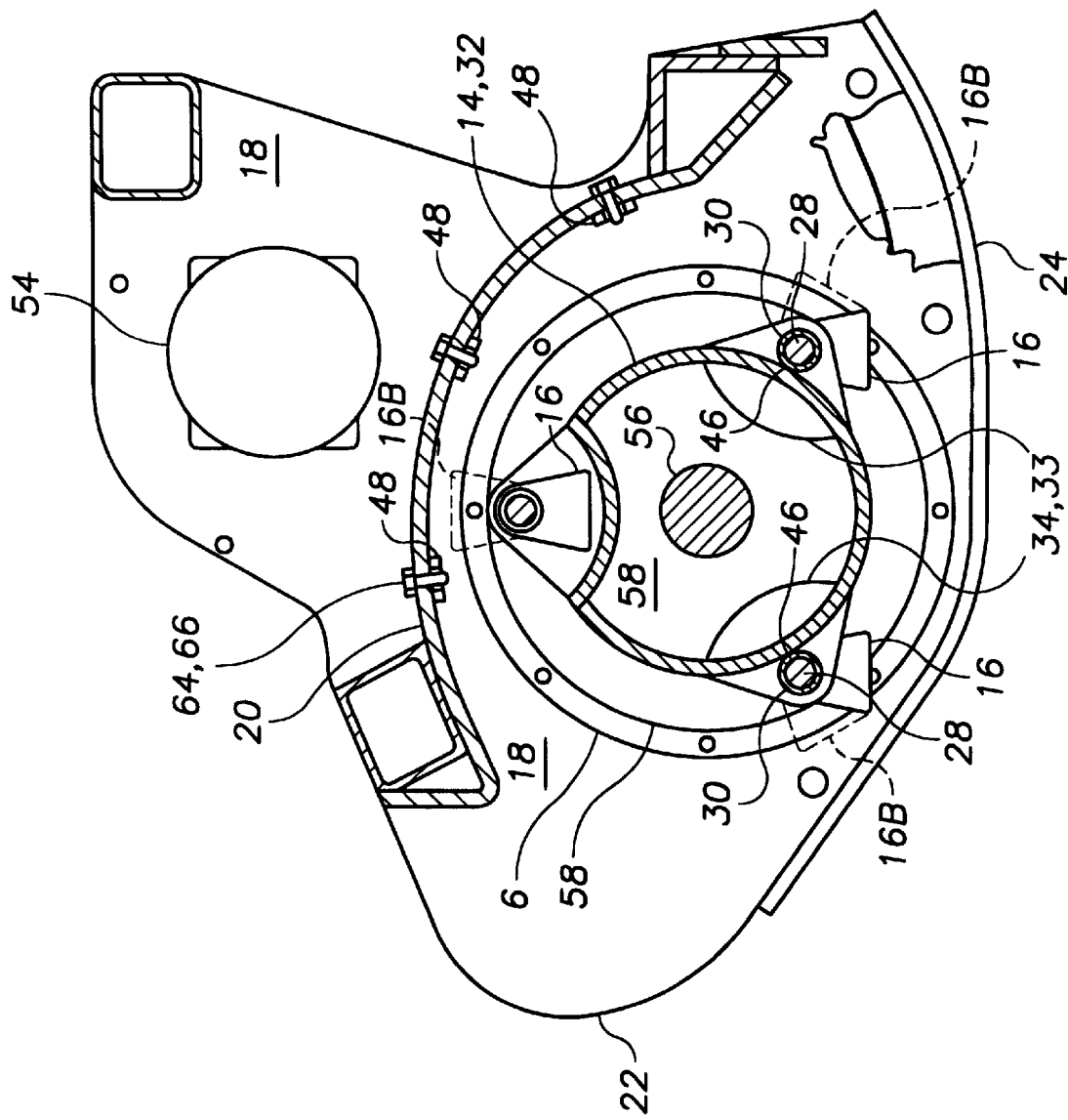
FIG. 2 is a cross-section view of the embodiment of FIG. 1 as seen along plane 2—2 of FIG. 1.

FIG. 2 shows a cross-section taken through rotor 14 to show stub shaft 56, bulkhead 58 and pocket 34. The welding of stub shaft 56 and bulkhead 58 into rotor 14 is done through the cutouts 33 made to install pockets 34. After the internal welding has been completed, pockets 34 are put in place and welded from outside. Also shown is the manner in which longitudinal "V" grooves 46 are machined on the outside diameter 32 of rotor 14 so as to provide longitudinal alignment of tubular blade spacers 30. "V" grooves 46 receive and align spacers 30 within machine tool tolerances and hold them in place for welding, without the need for any fixtures or tooling. Thus, the center alignment of spacers 30 is such that pivot shafts 28 can be easily removed and reinstalled for replacement of worn swinging blades 16. Access holes 75 are provided in end plates 18 for removal and replacement of pivot shafts 28 but are not seen in this view but are shown to be covered by drive guard covers 52 in subsequent views. An unobvious benefit of locating spacers 30 on the outside diameter of rotor 14 is found in operating the machine. Where the outside diameter of a smooth rotor would act like a brake drum when crowded into heavy brush, spacers 30 break up contact so as to reduce this drag and keep the rotor speed from bogging down.

Swinging blades 16 are shown in a static position, as when rotor 14 is at rest. Phantom outline position 16B shows how swinging blades 16 stand out when rotor 14 is turning at the nominal working speed of 2,000 rpm. The radiused pockets 34 are seen to extend into the interior of rotor 14 so as to allow 360° clearance for swinging blades 16. Shroud 20 is curved on a radius to allow chip clearance around the outer path of swinging blades 16. Hardened steel chip bars 48 interrupt chip flow around shroud 20 and serve as anvils to work with swinging blades 16 for shredding the chips. Chip bars 48 are mounted inside of shroud 20 by flat head machine screws 64 and nuts 66.

Circular rotor end plates 62, at each end of rotor 14 rotate with a small running clearance within fixed guard rings 60 to prevent passage of dirt and debris.

Figure 3B:
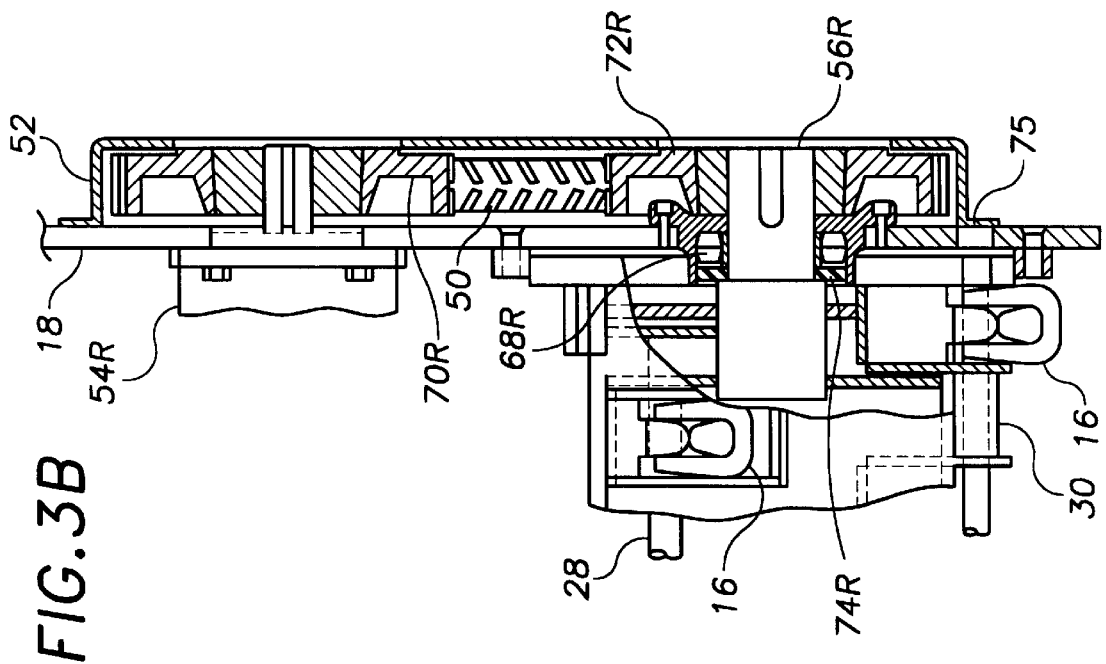
FIGS. 3A and 3B are longitudinal section views of the drum showing the left and right bearings and additional details.
Figure 3A:
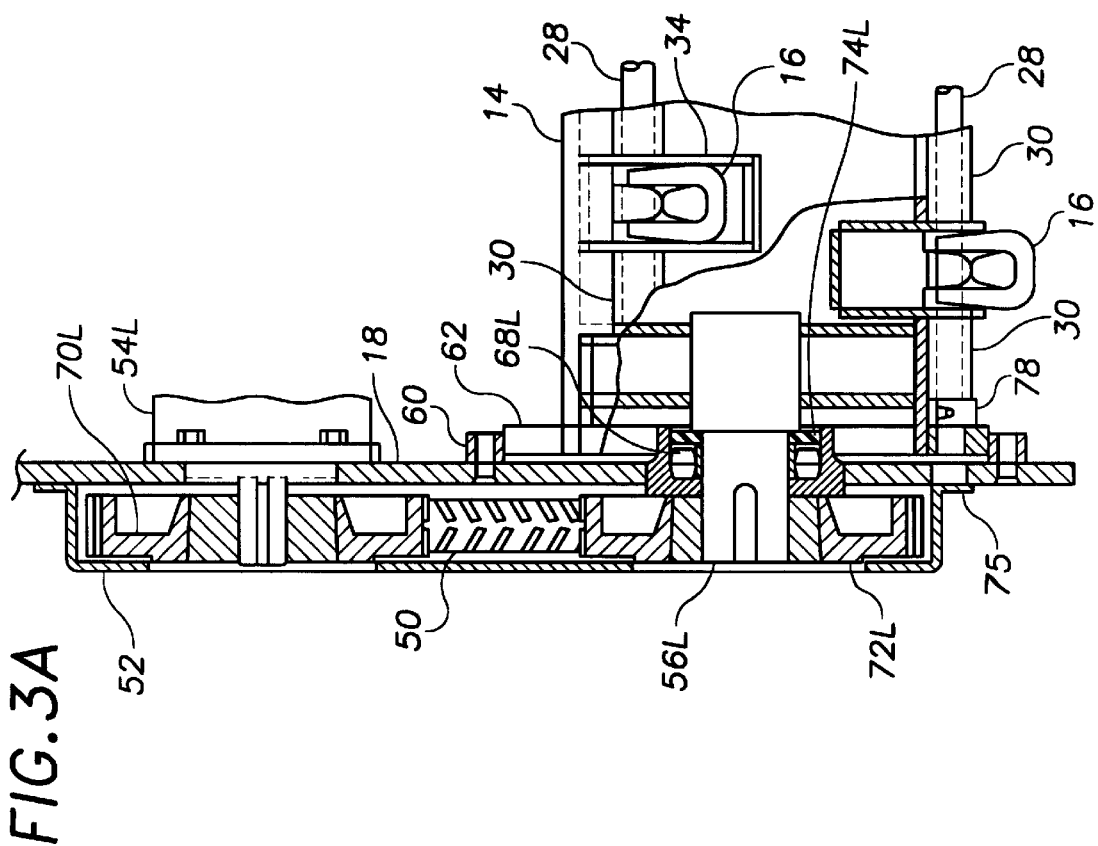

FIGS. 3A and 3B show another view of how guard rings 60 serve as a "first line of defense", keeping dirt and debris from the interior of rotor 14. Labyrinth seals 74R and 74L provide the final barrier, protecting bearings 68R and 68L from contamination. These crosssection views also show the rotor drive arrangement, with drive sprocket and hub assemblies 70L and 70R installed on hydraulic motors 54L and 54R respectively, and driven sprockets 72L and 72R mounted on rotor stub shafts 56L and 56R. Toothed belts 50 engage sprocket assemblies 70 and 72 for power transmission to rotor 14.

It is notable that bearing 68R is shown to be a spherical roller bearing while bearing 68L is shown to be a cylindrical roller bearing. In this arrangement bearing 68R carries all axial thrust loads and bearing 68L is allowed to "float". This permits both bearings to be mounted without the careful measurement and shimming otherwise needed to avoid excessive bearing preloads due to manufacturing tolerance variations.

The cross-section of rotor 14 also shows the manner in which pockets 34 provide the necessary clearance radius for swinging blades 16 within the interior of rotor 14. The removal of drive guard covers 52 allows blade pivot shafts 28 to be driven longitudinally, through hole 75 in end plate 18, for removal of swinging blades 16. The replacement of swinging blades 16 is by reversing this procedure. A consideration not widely appreciated in the art is that, not only should blades 16 be free to rotate on pivot shafts 28, but pivot shafts 28 should also be free to rotate within spacers 30 so as to minimize wear on all of the associated parts. Therefore, the manner of retention of blade pivot shafts 28 should be such that they are held longitudinally, but not against rotation. This requirement is addressed in the pivot shaft keeper assembly 76 of FIG. 4.

Figure 4:
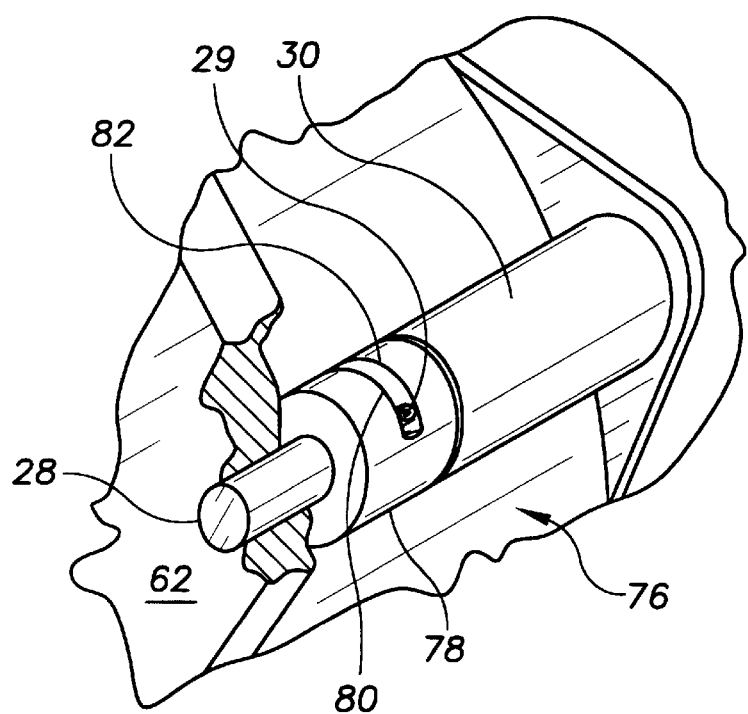
FIG. 4 is a detail view of the pivot shaft retainer.

In FIG. 4, pivot shaft keeper assembly 76 is seen to comprise keeper bushing 78 with half slot 80 at the approximate center of its length. Keeper bushing 78 is placed on pivot shaft 28, in spacer gap 82, between a spacer 30 and rotor end plate 62, when blades 16 are being installed. The length of keeper 78 fits loosely in the gap between rotor end plate 62 and spacer 30. Half slot 80 aligns with drilled hole 29 in pivot shaft 28, when pivot shaft 28 is in its proper longitudinal position. Half slot 80 allows the installer to locate drilled hole 29 and index slot 80 and hole 29 so that roll pin 82 can be driven through the diameter of pivot shaft 28. In this manner, pivot shaft 28 is retained longitudinally while being permitted to rotate so as to minimize wear on the associated parts.

Figure 5:
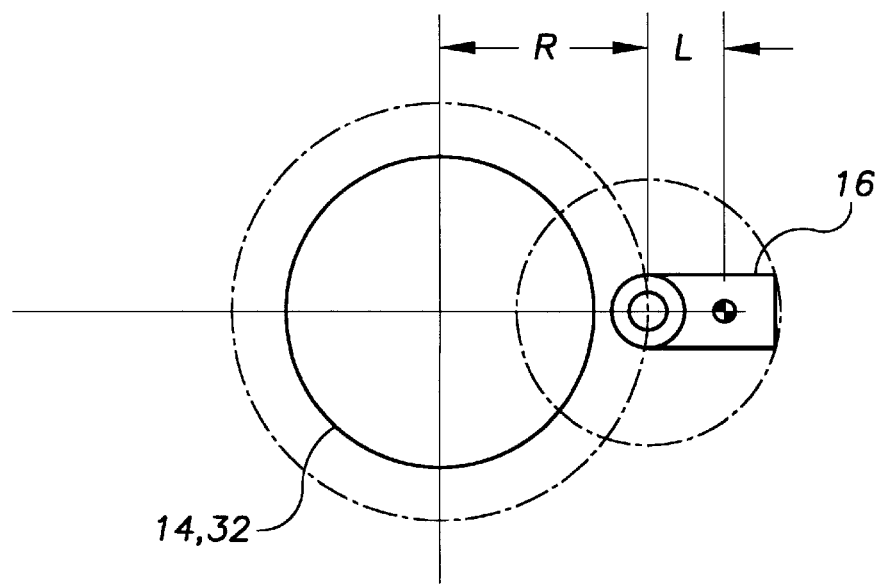
FIG. 5 is a diagram illustrating the preferred swinging blade action.

FIG. 5 shows a schematic relationship of swinging blades 16 with rotor 14 of outside diameter 32. When the kinetic energy of swinging blades 16 is overcome by impact against an obstacle, the blades 16 will rebound and return to their original extended position as rotor 14 continues to rotate. The timing of the return to position is determined by the geometry of rotor 14 and blade 16 and is independent of rotor rpm. It can be shown that the geometrical relationship that determines timing is the ratio of the square root of the radius R from the rotor axis to the blade pivot axis to the square root of the radius L of the center of percussion of swinging blade 16. Timing is most effective when the numerical value of this ratio is 0.5; 1.5; or 2.5, within a range of ±0.125. In a cutting head with geometry giving values in this range, the blades are swinging forward, at or near the fully extended position, in the direction of cutting head rotation, at the moment of impact. Thus, the total kinetic energy available at point of impact will be a function of the rotor rotational velocity plus the blade's swinging velocity. On the other hand, when the numerical value of this ratio is between 0.75 and 1.25; or between 1.75 and 2.25, cutting performance is relatively poor. This is because the blades are swinging backward, against the direction of cutting head rotation, at the moment of impact. In this case, the total kinetic energy available at point of impact will be a function of the rotor rotational velocity minus the blade's swinging velocity.

Rotor stiffness and dimensional stability are necessary for rotating balance because rotor imbalance will cause vibration throughout the machine and its prime mover, resulting in operator fatigue and eventually structural damage. Rotor stiffness and dimensional stability are also necessary for maintaining the pivot shaft alignment so critical to easy blade replacement.

As mentioned earlier, the weight of the machine attachment cannot be excessive, even though structural strength, stiffness and durability are challenged in its abusive, high impact service. Structural efficiency is therefore of the highest importance. Also, a high degree of flywheel effect is a desirable rotor property, quite beneficial for absorbing shock loads and leveling input power requirements so as to avoid stalling. But, flywheel effect comes only at the expense of extra weight and hence, must be factored in judiciously. In addition, rotor assembly manufacturability is critical, and not only from the cost point of view, although that is a major consideration. Manufacturability in the plant also equates to maintainability in the field. The swinging blades are wearing parts that must be replaced periodically.

Making rotor 14 as a large diameter tube addresses all of these needs. Within a given weight limit, flywheel effect is enhanced by placement of the greatest possible portion of the rotating mass at the greatest practical radius, while structural strength and stiffness are enhanced by providing this mass/radius as a seamless, monolithic part. Although there are no clear limits, design calculations and prototype testing experience indicates that the outside diameter of the rotor tube should be between 40% and 80% of the cutting path diameter. If the cross-sectional radius of rotor 14 were to be made greater than the attachment radius of pivot shafts 28, the flywheel effect and stiffness could approach the absolute maximum possible for a given blade configuration. However, manufacturability would sacrificed by maximizing tube diameter in this manner because, either internal assembly welds would be required or, the tube would have to be split apart and rewelded. The first would be costly and difficult, the second would sacrifice the inherent straightness and balance of the tubular section and be costly as well.

The embodiments shown and described above are exemplary. Many details are often found in the art and, therefore, many such details are neither shown nor described. It is not claimed that all of the details, parts, elements, or steps described and shown were invented herein. Even though numerous characteristics and advantages of the present inventions have been described in the drawings and accompanying text, the description is illustrative only, and changes may be made in the detail, especially in matters of shape, size, and arrangement of the parts within the principles of the inventions to the full extent indicated by the broad meaning of the terms of the attached claims.

The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. In a land clearing machine attachment of the type having a plurality of swinging blades that rotate about a horizontal axis, the improvement comprising:

a monolithic cylindrical rotor tube having internal and external surfaces and being mounted for rotation about the horizontal axis;

a plurality of swinging blades having a cutting tip at the first end and a shaft receiving mounting hole at the second end;

blade pivot shafts, the blades being mounted at their second end for free rotation on the blade pivot shaft, so that the blade tips swing through 360° at a radius thereabout; and a plurality of tubular blade pivot shaft attachments mounted directly to the external surface of the tubular rotor to support the blade pivot shafts parallel to the horizontal axis, the blade pivot shaft attachments receiving and supporting the blade assembly shafts so as to locate and hold the blades for free rotation thereon with the arcs of blade tip radii passing through clearance holes formed in the rotor tube wall and within the internal surface of the rotor.

2. A land clearing machine attachment according to claim 1 wherein the outside radius of the cylindrical tube is at least 40% of the maximum dimension from the swinging blade tip to the horizontal axis.

3. A land clearing machine attachment according to claim 1 and further comprising:

a rotor housing including first and second end plates, with upper and lower edges and supporting the rotor for rotation; and a rack for holding and pushing brush mounted above the rotor housing and proximate the end plate upper edges, the rack including a cross-bar substantially parallel to the rotor.

4. A land clearing machine attachment according to claim 1 and further comprising:

a rotor housing including first and second end plates, with upper and lower edges;

first and second bearings mounted on the first and second end plates respectively and supporting the rotor for rotation;

a hydraulic motor having an output shaft mounted on the first end plate, with the output shaft parallel to the rotor;

matching sprockets on the output shaft and the rotor; and a toothed drive belt connecting the sprockets.

5. A land clearing machine attachment according to claim 1 and further comprising:

a rotor housing including first and second end plates, with upper and lower edges; and first and second bearings mounted on the first and second end plates respectively and supporting the rotor for rotation, at least the first bearing being of a spherical roller, self aligning type.

6. A land clearing machine attachment according to claim 1 and further comprising:

a rotor housing including first and second end plates, with upper and lower edges;

first and second bearings mounted on the first and second end plates respectively and supporting the rotor for rotation;

the rotor further comprising a rotating circular end portion proximate each end plate; and a fixed ring mounted on each end plate and fitting around the rotating circular portion with a radial clearance of between one one-hundredth and one tenth of an inch.

7. A land clearing machine attachment according to claim 1 wherein the plurality of blade shaft attachments mounted to the external surface of the tubular rotor are aligned in longitudinal rows parallel to the horizontal axis by longitudinal "V" grooves in the outer surface of the rotor.

8. A land clearing machine attachment according to claim 1 wherein the relationship of the blade center of percussion radius and the rotating radius of the blade pivot shaft is such that, after shock displacement, the swinging blade returns to its fully extended position at the completion of one rotor revolution.

9. A machine attachment according to claim 1 and further comprising:

a rotor housing including first and second end plates, with upper and lower edges;

first and second bearings mounted on the first and second end plates and supporting the rotor for rotation; and skid plates mounted on the end plates at the lower edges thereof so as to contact the ground to hold the rotor at a substantially constant height.

10. A land clearing machine attachment according to claim 9 wherein the skid plates are formed with a ground contacting radius significantly greater than the rotor radius plus the blade radius, so that tilting the rotor housing, with the skid plates in contact with the ground and the rotor substantially horizontal, increases the substantially constant rotor height.

11. A land clearing machine attachment according to claim 1 wherein the plurality of blade shaft arrangements are mounted to the external surface of the tubular rotor in multiple longitudinal rows.

12. A method for clearing brush and trees from land comprising the steps of:

providing a monolithic cylindrical tube of substantial wall thickness, with exterior and interior surfaces and a horizontally oriented longitudinal axis;

providing a plurality of blades with a cutting edge at one end and an attaching hole at the other;

pivotally attaching the blades directly to the exterior surface of the cylindrical tube, to swing about an axis parallel to the longitudinal axis;

cutting clearance holes through the cylindrical tube wall and interior to allow the blades to swing through 360 degrees;

rotating the cylindrical tube and swinging blade assembly about the longitudinal axis; and crowding the rotating assembly against brush and trees so as to clear land.

13. A method for clearing brush and trees according to claim 12, with the additional steps comprising:

shielding and supporting the rotating assembly in a housing;

supporting the housing with respect to the ground by housing extensions that contact and slide along the ground surface; and tilting the housing so that the ground contacting extensions bear against the ground surface to lift the rotating assembly with respect to the ground.

14. A method for making a land clearing machine attachment of the type having a plurality of swinging blades and a rotor that rotates about a horizontal axis, comprising the steps of:

provyiding a plurality of blades having given percussion and swing radii;

providing a cylindrical tube rotor having an outside diameter, wall thickness, external and internal surfaces for the rotor;

cutting spaced apart holes through the wall thickness of the cylindrical tube to provide clearance for the blade swing radius;

assembling the swinging blades on blade pivot shafts separated by tubular spacers;

mounting the tubular spacers and pivot shafts directly to the external surface of the cylindrical tube so that the blades can swing through the spaced apart clearance holes;

mounting the cylindrical tubular rotor for rotation; and rotating the cylindrical tubular rotor so that the swinging blades stand out to a cutting diameter and cut brush and trees for land clearing.

15. A method for making a land clearing machine attachment according to claim 14 wherein the outside diameter of the cylindrical tube is between 40% and 80% of the cutting diameter.

* * * * *